Patented Sept. 30, 1941

2,257,114

UNITED STATES PATENT OFFICE 2,257,114

APPLICATION OF DRILLING FLUIDS

Philip E. Harth, Clayton, Mo.

No Drawing. Application August 22, 1936,
Serial No. 97,420

10 Claims. (Cl. 255—1)

This invention relates generally to drilling fluids, such as are used in rotary drilling of oil and gas wells and particularly to a weighting material for use in such fluids.

In this drilling of oil and gas wells by the rotary drilling method a fluid, such as mud is circulated down the drill stem and up through the bore hole on the outside of the drill stem so as to remove the cuttings from the region of the bit, lubricate the bit, etc., as is well known.

In order to control wells in which high gas pressures are or may be encountered, it is the practice to add a weighting material to the mud so as to increase or control the weight of the mud column sufficiently to overcome the pressure which may be encountered as the drilling progresses and thus prevent the pressure of the well from blowing the mud column out of the hole. Such material is also employed to control caving. Such a drilling fluid must have a viscosity of 5 to 35 Stormer at 600 revolutions per minute. Where the fluid is made of ordinary clay, the suspending medium is the colloidal component of clay; but very often bentonite is employed to furnish the suspending agent or supplement that in the clay.

The object of the present invention, generally stated, is to provide a new and improved weighting material for use in rotary drilling mud.

A more specific object of the invention is to provide a weighting material for a rotary drilling mud which may be cheaply and conveniently manufactured and one from which greater weighting of the mud may be accomplished by the use of smaller amounts than with the materials now customarily employed.

Other objects will become apparent to those skilled in the art when the following description is read.

In accordance with the invention, generally stated, the mud-weighting material is one of metal particles which are of a mesh fineness to be suspendable in a drilling fluid having a viscosity of 5 to 35 Stormer. In accordance with an embodiment of this invention, metal, such for instance as scrap iron, may be melted and atomized so as to produce particles of the desired size range, as for instance, from 150 to 325 mesh.

The atomization may be accomplished by the use of suitable nozzles employing an atomizing fluid, such as steam, with or without air, so as to produce a weighting material in finely divided form with a minimum of oxidation so as to maintain a high specific gravity of the material.

In order to minimize the oxidation the spray from the suitable nozzle may be discharged into a non-oxidizing atmosphere, such as an atmosphere of nitrogen or carbon dioxide or oil vapor or in fact into a bath of oil, water or liquid which will envelop the particles and prevent oxidation thereof.

A convenient procedure is to melt scrap iron in a suitable furnace, such as a cupola and discharge the molten stream under pressure through a nozzle from which it is atomized by the action of a fluid, such as a mixture of air and steam, into a chamber which is filled with nitrogen. In order to render the atomized material resistant to oxidation the atomizing chamber may contain a mist of a corrosion inhibitor, such for instance as a suitable oil, so, as the particles pass therethrough, they will be solidified and become coated or enveloped with a film of oil, or other well known corrosion inhibitors may be used instead of the oil and in fact when the spray is discharged into a liquid bath, suitable corrosion inhibitors may be dissolved in the bath.

In order to facilitate maintaining the atomized metal in suspension in a drilling fluid in which water is the primary liquid vehicle, the corrosion inhibitor employed may be one which of itself performs the function of an emulsifying agent tending to produce an oil in water emulsion. For instance, if the molten metal is sprayed into a mist of oil, the oil may have dissolved therein a small percentage of a sodium soap so that when the weighting material is introduced into the clay laden fluid which constitutes the mud, the particles will be readily wetted by the water and stabilized in suspension therein by the action of the emulsifying agent.

Corrosion inhibitors such as acridine, methyl acridine, phenyl acridine and the like which act both as corrosion inhibitors and emulsifying agents may be used with advantage.

Instead of applying the emulsifying agent directly to the particles of atomized weighting material or to the coating thereon, it will be understood, of course, that similar emulsifying agents may be added to the drilling fluid at the time the atomized weighting material is introduced and that with thorough mixing comparable results as to the stabilization will be accomplished.

It will be understood, of course, that the amount of the weighting material to be added to a given mud will depend upon the conditions which it is expected to encounter or have been encountered, in any case the amount of the atomized material added being determined in accordance with the weight per gallon which it is desired that the mud should have as is the practice with other conventional mud weighting materials.

From the foregoing description it is apparent that the invention accomplishes its objects and provides a mud weighting material of high specific gravity, the specific gravity of iron being 7.25 and other metals accordingly so that smaller quantities of the mud weighting material of the present invention will accomplish the desired weighting of a given mud.

While a process has been described for atomizing metals, it is to be understood that the metal may be secured in finely divided condition in other ways as by centrifuging the molten metals; such as for instance by a process of the character disclosed in U. S. Patent No. 2,040,168, granted May 12, 1936.

While in the foregoing description reference has been specifically made to the atomization of iron, it is not to be understood that the invention is limited to atomization of iron, or the use of atomized iron as a mud weighting material, but that the principles of the present invention are applicable to metals and other high specific gravity materials at large. It is to be understood, therefore, that the procedure hereinbefore described may be modified and various features of the present invention may be used without reference to other features and, although such modifications and adaptation of features have not been specifically described herein, they are, nevertheless, contemplated by and within the scope of the appended claims.

Having thus described the invention, what is claimed is:

1. A mud weighting material adapted for employment in well drilling fluids comprising particles of a metal which is subject to oxidization but which particles are surface-treated with an agent adapted to prevent such oxidization, said treated particles being of a mesh fineness to be suspendable in a drilling fluid having a viscosity of 5–35 degrees Stormer.

2. A mud weighting material adapted for employment in well drilling fluids comprising non-oxidizable metal particles which are surface-treated with an agent rendering said particles wettable by the aqueous phase of the drilling fluid, said treated particles being of a mesh fineness to be suspendable in a drilling fluid having a viscosity of 5–35 degrees Stormer.

3. A mud weighting material adapted for employment in well drilling fluid comprising iron particles which are surface-treated with an agent adapted to prevent oxidization of the iron, said treated particles being of a mesh fineness to be suspendable in a drilling fluid having a viscosity of 5–35 degrees Stormer.

4. A mud weighting material adapted for employment in well drilling fluids comprising non-oxidizable atomized metal particles enveloped by a wetting agent and which are of a mesh fineness to be suspendable in a drilling fluid having a viscosity of 5–35 degrees Stormer.

5. A mud weighting material adapted for employment in well drilling fluid comprising atomized metal particles enveloped by a corrosion inhibitor and which are of a mesh fineness to be suspendable in a drilling fluid having a viscosity of 5–35 degrees Stormer.

6. A mud weighting material adapted for employment in well drilling fluid comprising non-oxidizable atomized metal particles enveloped by a film of oil and which are of a mesh fineness to be suspendable in a drilling fluid having a viscosity of 5–35 degrees Stormer.

7. A mud weighting material adapted for employment in well drilling fluids comprising non-oxidizable atomized metal particles enveloped by a film of oil containing an emulsifying agent and which are of a mesh fineness to be suspendable in a drilling fluid having a viscosity of 5–35 degrees Stormer.

8. A drilling fluid comprising a suspending agent and of a viscosity of 5 to 35 Stormer, and a mud-weighting material of particles of a metal which is subject to oxidization but which particles are surface-treated with an agent adapted to prevent such oxidization, said treated particles being of a mesh fineness to be suspendable in such a fluid.

9. A drilling fluid comprising a suspending agent and of a viscosity of 5 to 35 Stormer, and a mud-weighting material of iron particles surface-treated with an agent adapted to prevent oxidization of the iron, said treated particles being of a mesh fineness to be suspendable in such a fluid.

10. In the art of boring or controlling oil or gas wells, the process comprising introducing into the well a mud-laden fluid of a viscosity of 5 to 35 Stormer, and controlling the specific gravity of the fluid by the addition of iron particles surface-treated with an agent adapted to prevent oxidization of the iron, said treated particles being of a mesh fineness to be suspendable in such a fluid.

PHILIP E. HARTH.